S. G. Mason,

Scroll Saw.

No. 104,613.   Patented June 21, 1870.

Witnesses:
J. Chase
F. H. Clement

Inventor:
Sylvester G. Mason

United States Patent Office.

SYLVESTER G. MASON, OF ROCHESTER, NEW YORK.

Letters Patent No. 104,613, dated June 21, 1870.

---

IMPROVEMENT IN SAW-HANGINGS.

---

The Schedule referred to in these Letters Patent and making part of the same

---

*To all whom it may concern:*

Be it known that I, SYLVESTER G. MASON, of Rochester, in the county of Monroe, and State of New York, have invented a new and useful Jig-saw Clamp; and I do hereby declare that the following is a full, clear, and exact description thereof, reference being had to the accompanying drawing making part of this specification, in which—

Figure 1:
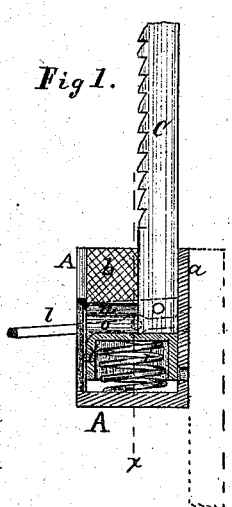
Figure 1 is a vertical central section of my invention.

The object of my invention (the nature of which will be understood by reference to the drawing and specification) is to provide a means of quickly attaching or detaching a jig-saw to or from the driving cross-head.

To enable others to make and use my invention, I will describe its construction and operation.

To the cross-head of an ordinary jig-saw I rivet or otherwise securely attach the casting A, which is cored out to receive the clamping device.

Figure 2:
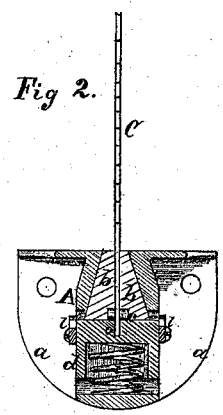
Figure 2 is a transverse section, taken in the plane of the dotted line $x$ in fig. 1.

The jaws $b$, made of a suitable metal, are wedge-shaped, as shown in fig. 2, and are fitted to slide in a vertical tapering recess provided in the casting A.

As the jaws are pushed upward in this recess, they are forced to clamp the saw C between them, as seen in fig. 2.

Directly under the clamping-jaws the casting A is cored out to receive the follower $d$, which is retained in contact with the jaws by the spring $i$.

The lower inner edge of the clamping-jaws are rabbeted out, as shown at $n$, fig. 1, to receive the pin $c$, usually inserted in the saw near its end.

This pin enters the recess formed by the rabbet $n$ and the upper face of the follower $d$, while the extremity of the saw slides in a groove, $o$, formed in said follower.

An opening in the front of the casting A registers with these grooves, so as to admit the saw easily.

For the purpose of conveniently operating follower and clamping-jaws, I pivot to the former, upon each side, the forked lever or bale $l$, having a fulcrum in the flange $a$, as shown in dotted lines in fig. 1, and extending some distance in front of and around the casting A.

In adjusting the saw, the operator presses the bale $l$ with the thumb, which depresses the follower $d$, and allows the jaws $b$ to drop down and separate somewhat.

The saw is then pushed in between the jaws, the pin $e$ entering the rabbet $n$, when, on releasing the lever, the saw is tightly clamped by means of the spring $i$, operating upon the jaws $b$ through the follower $d$.

It will be seen that the same center line is preserved for the saw, whatever its thickness, and that the device is applicable to any width of saws.

My improvement is of very great convenience in all fancy, scroll, and bracket sawing, where it is necessary to attach and detach the saw many times every hour, since the operation can be performed almost instantaneously, even when the cross-head is under the table out of sight.

It is desirable that the jaws $b$ be of hardened steel, file-cut upon their inner faces, since a pressure upon the back of the saw might otherwise displace it.

The upper side of the rabbet $n$ may be inclined toward the back $a$, as shown by dotted lines in fig. 1, so that the tension of the straining-spring will retain it against the said back.

What I claim as my invention, and desire to secure by Letters Patent, is—

1. The wedge-shaped sliding jaws $b$ and inclined guides, in combination with the follower $d$ and spring $i$, for the purpose herein set forth.

2. The lever $l$, in combination with the follower $d$ and jaws $b$, for the purposes specified.

SYLVESTER G. MASON.

Witnesses:
   J. CHASE,
   F. H. CLEMENT.